United States Patent [19]
George et al.

[11] Patent Number: 6,033,794
[45] Date of Patent: Mar. 7, 2000

[54] MULTI-STAGE FUEL CELL SYSTEM METHOD AND APPARATUS

[75] Inventors: Thomas J. George; William C. Smith, both of Morgantown, W. Va.

[73] Assignee: The United States of America as represented by the United States Department of Energy, Washington, D.C.

[21] Appl. No.: 08/988,132

[22] Filed: Dec. 10, 1997

[51] Int. Cl.[7] .............................. H01M 8/04; H01M 8/00; H01M 8/18
[52] U.S. Cl. ................................. 429/24; 429/13; 429/17; 429/19; 429/20
[58] Field of Search .................... 429/13, 17, 19, 429/20, 24

[56] References Cited

U.S. PATENT DOCUMENTS

| 5,413,878 | 5/1995 | Williams et al. . |
| 5,480,738 | 1/1996 | Elangovan et al. . |
| 5,518,828 | 5/1996 | Senetar . |
| 5,573,867 | 11/1996 | Zafred et al. . |
| 5,712,055 | 1/1998 | Khandkar et al. ........................ 429/31 |

*Primary Examiner*—Maria Nuzzolillo
*Assistant Examiner*—Tracy Dove
*Attorney, Agent, or Firm*—Bradley W. Smith; Mark P. Dvorscak; William R. Moser

[57] ABSTRACT

A high efficiency, multi-stage fuel cell system method and apparatus is provided. The fuel cell system is comprised of multiple fuel cell stages, whereby the temperatures of the fuel and oxidant gas streams and the percentage of fuel consumed in each stage are controlled to optimize fuel cell system efficiency. The stages are connected in a serial, flow-through arrangement such that the oxidant gas and fuel gas flowing through an upstream stage is conducted directly into the next adjacent downstream stage. The fuel cell stages are further arranged such that unspent fuel and oxidant laden gases too hot to continue within an upstream stage because of material constraints are conducted into a subsequent downstream stage which comprises a similar cell configuration, however, which is constructed from materials having a higher heat tolerance and designed to meet higher thermal demands. In addition, fuel is underutilized in each stage, resulting in a higher overall fuel cell system efficiency.

21 Claims, 6 Drawing Sheets

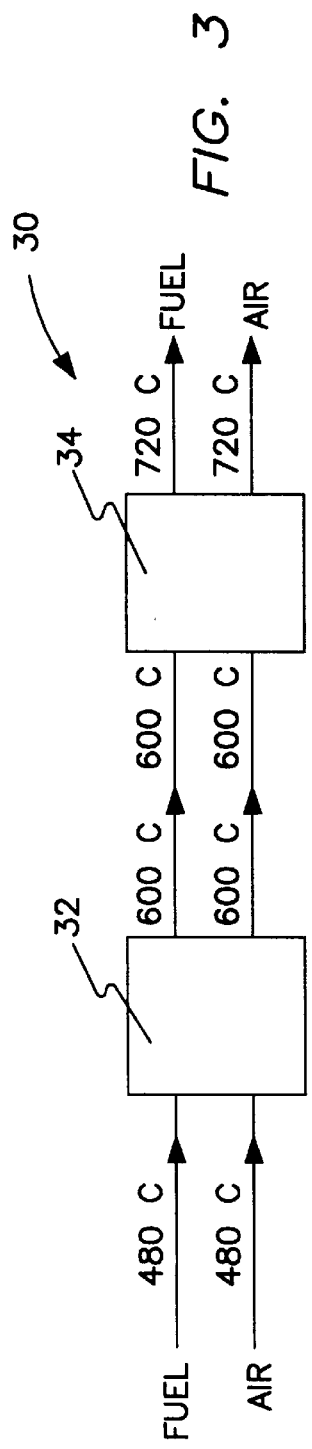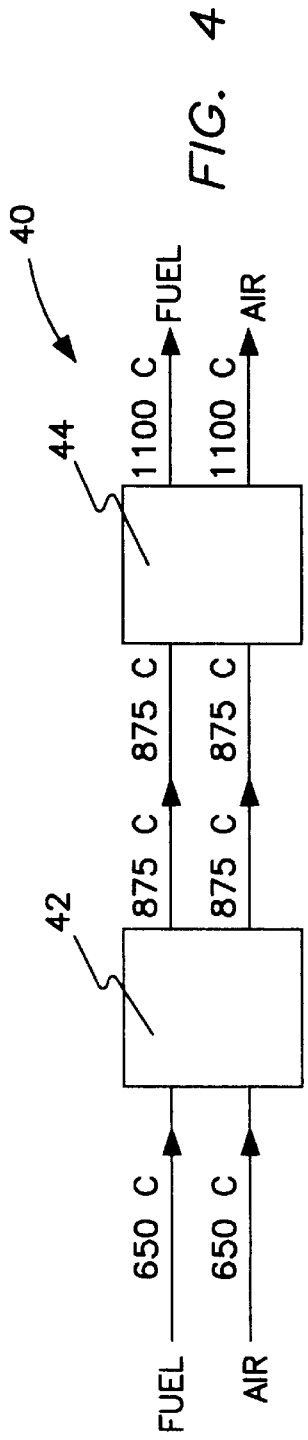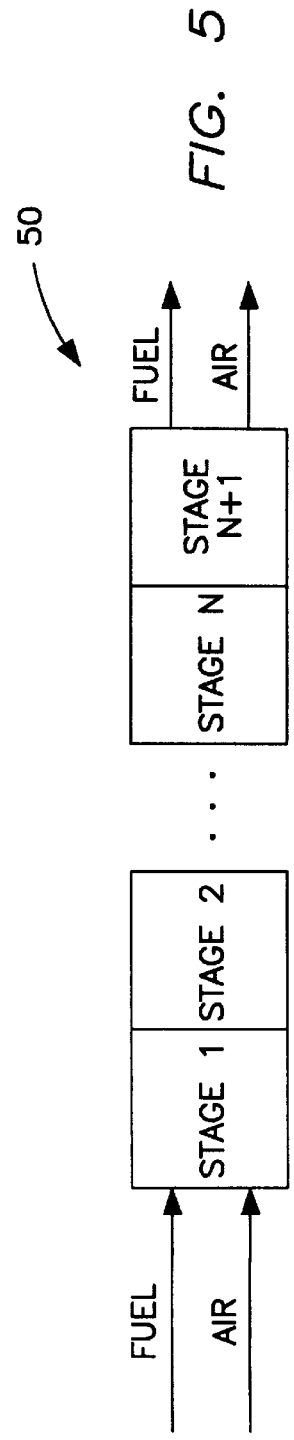

MULTI-STAGE FUEL CELL SYSTEM METHOD AND APPARATUS

ORIGIN OF THE INVENTION

The United States Government has rights in this invention pursuant to the employer-employee relationship of the U.S. Department of Energy and the inventor(s).

TECHNICAL FIELD

The present invention is a multi-stage fuel cell method and apparatus for optimizing fuel cell system performance and achieving high fuel cell system efficiency, while reducing or eliminating the need for heat removal equipment and/or excess oxidant gas for cooling the fuel cell system. In particular, the fuel cell system is comprised of multiple stages, whereby each stage is designed to accommodate progressively higher temperatures and fuel is underutilized in each fuel cell stage.

BACKGROUND OF INVENTION

Fuel cells are electrochemical devices that convert the chemical energy of reaction directly into electrical energy. The basic physical structure of a single fuel cell includes electrodes (an anode and a cathode) and an electrolyte between and in contact with the electrodes. To produce electrochemical reactions at the electrode, a continuous fuel stream and a continuous oxidant stream are supplied to the anode and cathode, respectively. The fuel cell electrochemically converts a portion of the chemical energy of the fuel in the fuel stream to electricity, while the remaining amount of the chemical energy is released as heat. A stack of individual fuel cells are connected in electrical series to generate a useful voltage, and the byproduct heat may be used for generation of additional electricity by means of a bottoming cycle, such as a steam cycle. To be a competitive alternate source of energy, however, the costs of fuel cell technology must be reduced and performance increased.

The type of electrolyte comprised in a fuel cell is generally used to classify the fuel cell and is also determinative of certain fuel cell operating characteristics, such as operating temperature. Classes of fuel cells under current development are the Polymer Electrolyte Fuel Cell (PEFC), the Alkaline Fuel Cell (AFC), the Phosphoric Acid Fuel Cell (PAFC), the Molten Carbonate Fuel Cell (MCFC), and the Solid Oxide Fuel Cell (SOFC). The operating temperature of a fuel cell strongly effects the fuel cell electrochemical conversion efficiency, the quality of the bottoming cycle, and the cost and endurance of the fuel cell system. The upper and lower limits of the operating temperature of a fuel cell are determined by several factors, including electrolyte stability and vapor loss, the chemical stability of the fuel cell materials, and the thermomechanical characteristics of the fuel cell components (i.e. the ability of fuel cell to withstand thermal stress induced by the temperature gradient across the fuel cell).

High temperature fuel cells include MCFCs and SOFCs, which operate at temperatures of about 650° C. and 1000° C., respectively. High operating temperatures are beneficial to fuel cell performance because of increased reaction rates, higher mass transfer rates, and lower cell resistance due to the higher ionic conductivity of the electrolyte. High temperature fuel cells are also attractive because operating temperatures of greater than 600° C. allow internal reforming of the fuel stream, an endothermic reaction useful for controlling the internal operating temperature of the fuel cell. Additional advantages of high temperature fuel cells are the production of sufficiently high temperature heat for generating steam for use in bottoming cycles, such as gas turbine cycle, and the use of less expensive catalysts than those required in lower temperature fuel cells. Disadvantages of operating fuel cells at high temperatures include limitations on the materials selected for fabrication, problems due to interfacial reactions among adjacent components, and high mechanical stresses resulting from the differential thermal expansion of adjacent materials.

In operation, the flow and utilization of the continuous gaseous fuel stream creates a temperature gradient across the fuel cell stack. As fuel is consumed in the electrochemical reaction at the anode surfaces, the operating temperature of the fuel cell rises due to the heat of reaction, increasingly activating the electrochemical reaction. The fuel cell must be cooled for efficient generation of electricity. In addition, the reaction at the anode reduces the percentage of fuel in the fuel gas as it flows through the fuel cell, progressively reducing the amount of fuel consumed in electrochemical reactions, such that the electrochemical reactions become slightly more inactive. Although the thermodynamic conversion potential decreases as the fuel cell operating temperature increases, higher reaction rates, higher mass transfer rates, and lower cell resistance usually result in a net positive impact on energy conversion efficiency at higher temperatures.

Conventional methods for cooling fuel cell stacks, in order to comply with the temperature limits of the fuel cell materials, incorporate heat transfer elements between fuel cell stacks and/or supply excess oxidant to the fuel cell system. Disadvantages of using external heat exchangers are increased maintenance and capital equipment costs. Similarly, circulating or recirculating oxidant in excess of the stoichiometric requirement for the reaction of oxidant on the cathode electrode decreases system efficiency and increases capital and operating costs.

Conventional approaches to increase the efficiency of a fuel cell system are based on the principal of maximizing fuel utilization (the amount of total fuel supplied that reacts electrochemically) in any single fuel stage. Fuel sharing and splitting configurations, wherein fuel and air streams are networked in series and/or parallel flow arrangements, are designed to improve fuel utilization by maintaining a uniform operating temperature across the fuel cell system, such that all the fuel cell stacks operate at the same temperature and each fuel cell stack operates at its maximum efficiency. Achieving uniform fuel distribution is critical to the successful operation of the fuel cell stack, as damaging hot spots are caused within the fuel cells by uneven or maldistribution of the fuel gas.

A need continues to exist in the art for a reduction in cost and increase in performance of fuel cell systems.

The present method and apparatus provides a high temperature fuel cell system that substantially reduces the economic and operating inefficiencies of the prior art systems by connecting in series at least two fuel cell stages having different operating temperature ranges and underutilizing the fuel in each stage. According to the present fuel cell system, the pathways for the oxidant and fuel gases, referred to herein as process gases, are provided continuously throughout the system, such that the process gases enter a first, upstream stage, continue to flow through the upstream stage, exit the upstream stage, and flow directly into the next adjacent downstream stage. Each stage is designed to operate within a predetermined temperature range to accommodate the progressively higher temperatures of the process gases as they proceed through the system. A certain percentage of the fuel stream is consumed in each stage, and the system is further designed to underutilize the fuel available in the fuel stream in each stage. Unlike conventional fuel cell systems which maintain uniform operating temperatures from fuel cell stage to fuel cell stage and maximize fuel utilization per fuel cell stage resulting in the need for external cooling systems and fuel networking schemes, Applicants' method and apparatus optimizes the efficiency of the fuel cell system, while substantially eliminating the need for auxiliary cooling and fuel supply means.

Therefore, in view of the above, a basic object of the present invention is to provide a fuel cell system that reduces or eliminates the need for costly, auxiliary cooling equipment by providing a fuel cell system comprised of multiple fuel cell stages connected in series, whereby each fuel cell stage is designed to operate within a predetermined temperature range, and, preferably, whereby each fuel cell stage is designed to operate within a higher temperature range than the operating temperature range of the adjacent upstream fuel cell stage.

Another object of this invention is to provide a fuel cell system that achieves high operating efficiency by allowing significant underutilizing of the fuel within various stages of the multi-stage fuel cell system.

Another object of this invention is to provide a fuel cell system that achieves high operating efficiency by allowing the amount of fuel underutilized per stage to be equal for each stage of the fuel cell system, whereby there is equal fuel consumption in each stage, or by allowing the amount of fuel underutilized per stage to be variable, whereby there is unequal fuel consumption in each stage.

Yet another object of this invention is to provide a fuel cell system that minimizes material and fabrication costs and difficulties associated with high temperature fuel cell designs.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of method and apparatus and combinations particularly pointed out in the appended claims.

BRIEF SUMMARY OF THE INVENTION

This invention relates to a high efficiency, multi-stage fuel cell system, and, in particular, a fuel cell system comprised of multiple stages, whereby the temperatures of the fuel and oxidant gas streams and the percentage of fuel consumed are controlled in each stage to optimize fuel cell system performance. Each stage is designed to operate within a predetermined temperature range and is connected in series to an adjacent stage, whereby the process streams flow into and through the first upstream stage and are then conducted directly into next adjacent downstream stage. Preferably, each downstream stage is fabricated to operate at higher temperatures than at least one of the upstream stages, with significant underutilization of the fuel in each of the fuel cell stages.

Each stage of the multi-stage system contains a fuel cell stack having conventional passages for conducting the oxidant and fuel streams (process streams), and each fuel cell stack is comprised of individual fuel cells connected in electrical series. The materials and fabrication methods for constructing the individual fuel cells and fuel cell stack are a function of the predetermined operating temperature range of the stage. Each stage has oxidant and fuel stream inlets for admitting oxidant and fuel streams and oxidant and fuel stream outlets for discharging oxidant and fuel streams, and each stage is connected to the next adjacent stage, such that the process streams are conducted from an upstream stage to the next adjacent downstream stage in a flow-through arrangement. The inlet temperatures of the process streams and the operating temperature difference across the each stage (i.e. the temperature difference between the process inlet streams and the process outlet streams) are maintained within predetermined temperature ranges to provide for underutilization of the process streams, such that only a desired amount of the fuel gas is consumed. A pressure vessel provides containment for the multiple stages.

Importantly, the downstream stages are designed to accommodate progressively higher operating temperatures than the upstream stages. Thus, unspent fuel and oxidant laden gases too hot to continue within a stage because of material constraints are conducted into a subsequent downstream stage which comprises a similar cell configuration, however, which is constructed from materials having a higher heat tolerance and designed to meet higher thermal demands. Upstream stages which operate at lower temperatures are fabricated from less expensive materials and by less expensive manufacturing processes than downstream stages, which must be manufactured from materials and by methods that withstand the higher operating temperatures. Also significant is the intentional underutilization of fuel within the fuel cell stages as compared to the conventional approach of maximizing fuel utilization per fuel stage. Contrary to conventional teaching, allowing significant underutilization of the fuel gas in each stage results in a highly efficient fuel cell system.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 3 is a schematic illustration of the present multi-stage fuel cell system, including molten carbonate fuel cell (MCFC) stages having differing operating temperature ranges;

FIG. 4 is a schematic illustration of the present multi-stage fuel cell system, including solid oxide fuel cell (SOFC) stages having differing operating temperature ranges;

FIG. 5 is a schematic illustration of the present multi-stage fuel cell system; whereby each stage is designed to operate within a predetermined operating temperature range and fuel is underutilized in each stage;

DETAILED DESCRIPTION OF THE INVENTION

The present method and apparatus is a multi-staged fuel cell system, whereby each stage of the multi-stage system is connected in series to an adjacent stage and whereby each stage is designed to operate within a predetermined temperature range. Each stage is designed to accommodate progressively higher temperatures, and the fuel gas is utilized along the length of the system in predetermined amounts, whereby the fuel is underutilized in each stage.

The present invention will be illustrated through a detailed description of its application in the connection and operation of solid oxide fuel cells (SOFCs) and molten carbonate fuel cells (MCFCs), however, it will be obvious to those skilled in the art from the following descriptive material that the invention is likewise applicable to any system employing a plurality of interconnected electrochemically active devices.

Figure 1:
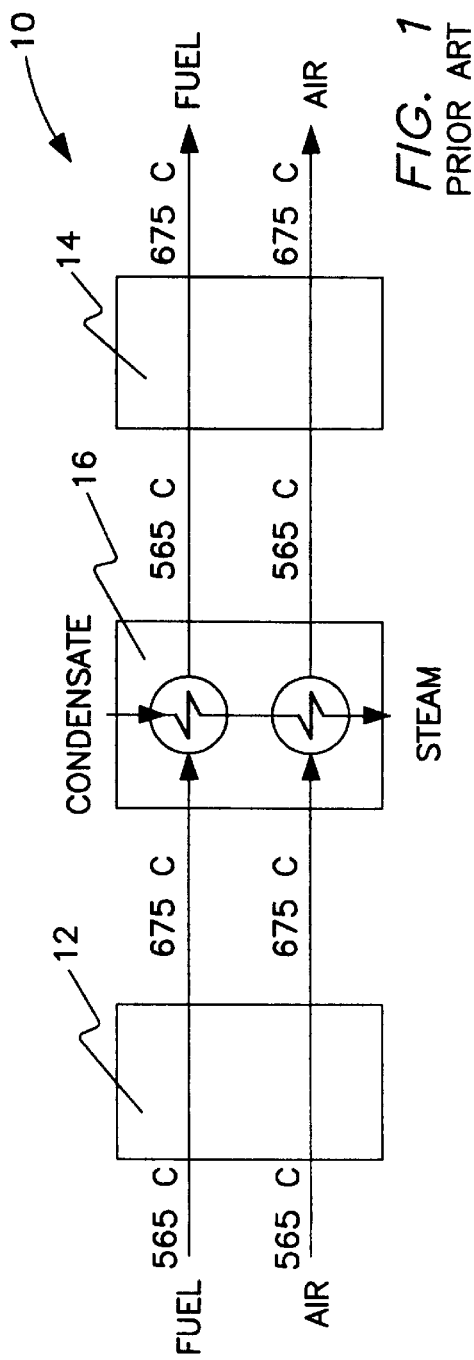
FIG. 1 is a schematic illustration of a prior art molten carbonate fuel cell (MCFC) system, including same temperature fuel cell stages and external cooling means.

FIG. 1 is a schematic illustration of a prior art straight-through, MCFC system 10 having a high temperature stage 12 connected in series to a second high temperature stage 14, with an external means for cooling 16 the air and fuel streams (the process streams) between the stages 12, 14. It is known to network the anode (fuel) and cathode (air) process streams in series fluid flow, such that a portion of the fuel is consumed in each fuel cell stage 12, 14. Both fuel cell stages 12, 14 operate within the same high temperature range, whereby the oxidant and fuel gas streams enter each fuel cell stack at about 565° C. and exit each fuel cell stack at about 675° C. Thus, the process streams must be cooled between stages 12, 14 to meet the temperature constraints of the downstream stage 14. When fuel and oxidant streams flow co-currently within the fuel cell stacks (not shown) contained within and comprising the fuel cell stages, their temperatures increase and their electrochemical potentials decrease, causing non-uniform temperature and current distributions. As a result, the cost of the downstream fuel cell stage 14, in dollars/kilowatt generated, is significantly higher when compared to the upstream fuel cell stack 12, as the volumetric fuel (fuel vs. fuel gas) and oxidant requirements of the downstream fuel cell stage 14 are the same as the upstream fuel cell stage 12, yet of the fuel and oxidant gases have been partially spent. In addition, the cooling apparatus 16 represents significant equipment, operating, and maintenance costs.

Figure 2:
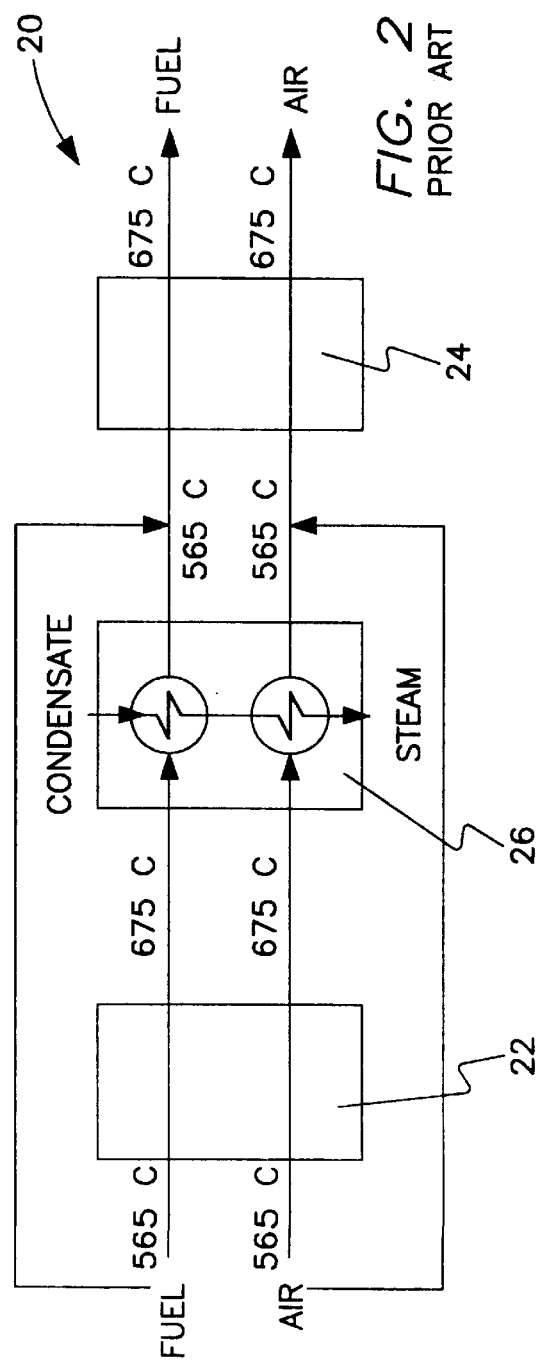
FIG. 2 is a schematic illustration of a prior art molten carbonate fuel cell (MCFC) system, including same temperature fuel cell stages, external cooling means and networking of the fuel and oxidant streams.

FIG. 2 is a schematic illustration of a prior art straight-through, MCFC system 20 having an upstream high temperature stage 22 connected in series to a downstream high temperature stage 24, with an external means for cooling the process streams 26, and split and/or shared air and fuel gas streams. This design more equitably balances the load between upstream and downstream fuel cell stages by feeding fresh fuel and/or oxidant streams to downstream fuel cell stages to optimize fuel consumption over the entire system. Uniform temperature distribution allows stacks to be operated nearer their maximum operating temperature. Again, each stage 22, 24 is designed to operate within the same temperature range.

FIGS. 3, 4 and 5 schematically illustrate an embodiment of the present method and apparatus. Importantly, external cooling devices, including apparatus to circulate cooling gases and recirculate fuel or oxidant gases, are not employed. Instead, according to Applicants' apparatus and method, each fuel cell stage is designed and constructed from materials appropriate for operation within a predetermined temperature range. The inlet process stream temperatures and the heat of reaction are controlled for each stage, and the fuel cell stages are uniquely sequenced to match the temperatures of the process streams under reaction conditions.

FIG. 3 depicts a two stage MCFC system 30, including a first high temperature stage 32 having an operating range of between about 480° C. to about 600° C., and a second higher temperature stage 34 having an operating temperature range of between about 600° C. to about 720° C. FIG. 4 shows a two stage SOFC system 40, including a first high temperature stage 42 having an operating temperature range of between about 650° C. to about 875° C. and a second higher temperature stage 44 having an operating temperature range of between about 875° C. to about 1100° C. FIG. 5 illustrates that the multi-stage fuel cell system 50 may be comprised of several (N+1) fuel cell stages connected in series. For example, a three stage fuel cell system could include a first stage operating in the temperature range of between about 400° C. to about 600° C., a second stage operating in the temperature range of between about 600° C. to about 800° C., and a third stage operating in the temperature range of between about 800° C. to 1000° C. In addition, the fuel cells contained within the stage may vary throughout the system, such that a SOFC stage may be connected in series to a MCFC stage, or other combinations of fuel cells known in the art.

The present multi-stage fuel cell system is designed to result in fuel underutilization within any given stage, which is contrary to the conventional approach of maximizing fuel utilization to as high as practically possible in each stage. (Fuel utilization is the fraction of the total fuel introduced into a fuel cell that reacts electrochemically.) According to Applicants' method and apparatus, temperature is controlled within each stage by limiting the total cell reaction surface area in the stage to the area which consumes the desired incremental amount of fuel. By controlling the available reaction surface, the amount of heat released by the reactions is also controlled, and the temperature rise per stage can be regulated. The conventional approach teaches that operating a fuel cell system at maximum fuel utilization (about 85%) for each fuel cell stack optimizes the efficiency of the fuel cell system. However, maximizing fuel utilization often results in hot spots and fuel cell damage or destruction. By maintaining fuel utilization at a lower level, as in the present method, wherein fuel utilization per individual stage is significantly decreased, the risk of hot spot damage is greatly reduced. Furthermore, the overall fuel utilization of the multi-stage system as a whole is designed to exceed 90% fuel utilization.

Table I below lists one of the many possible fuel utilization strategies for a five stage fuel cell system (representing any fuel cell technology), including overall system efficiency.

TABLE I

Fuel Utilization per Stage and
Overall for a Five-Stage Fuel Cell System

| Stage | Fuel Utilization | Fraction of Fuel Out | Fraction of Fuel Used | Percent of Fuel Used | Fuel Inlet Temperature |
|---|---|---|---|---|---|
| 1 | 19.0% | 0.810 | 0.190 | 19.0% | 650° C. |
| 2 | 23.5% | 0.620 | 0.190 | 19.0% | 740° C. |
| 3 | 30.7% | 0.429 | 0.190 | 19.0% | 830° C. |
| 4 | 44.3% | 0.239 | 0.190 | 19.0% | 920° C. |
| 5 | 75.0% | 0.060 | 0.179 | 17.9% | 1010° C. |
| Total Fuel Utilization: | | | 0.940 | 94.0% | |

Figure 6:
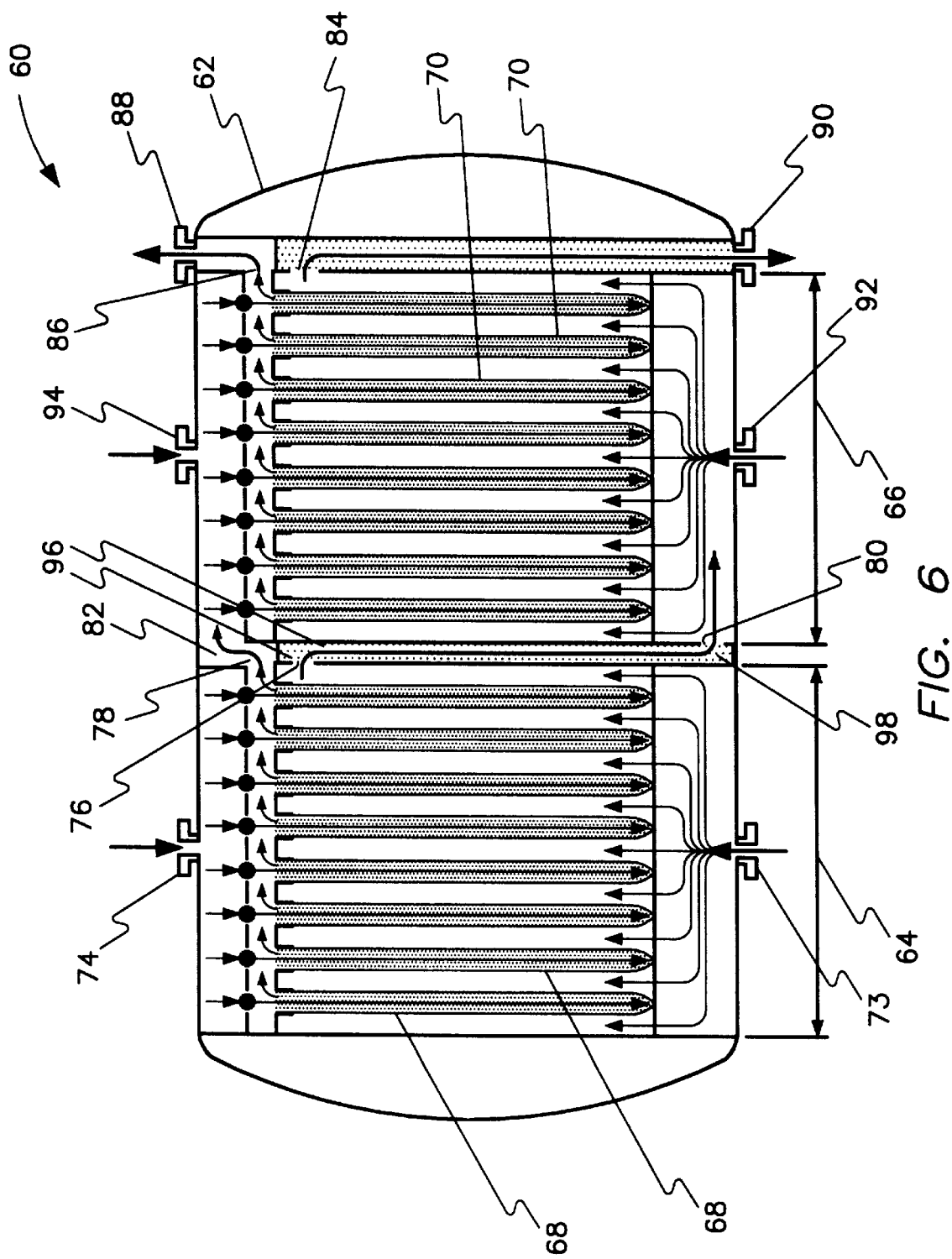
FIG. 6 shows a two stage solid oxide fuel (SOFC) cell system according to the present multi-stage fuel cell system.
Figure 7:
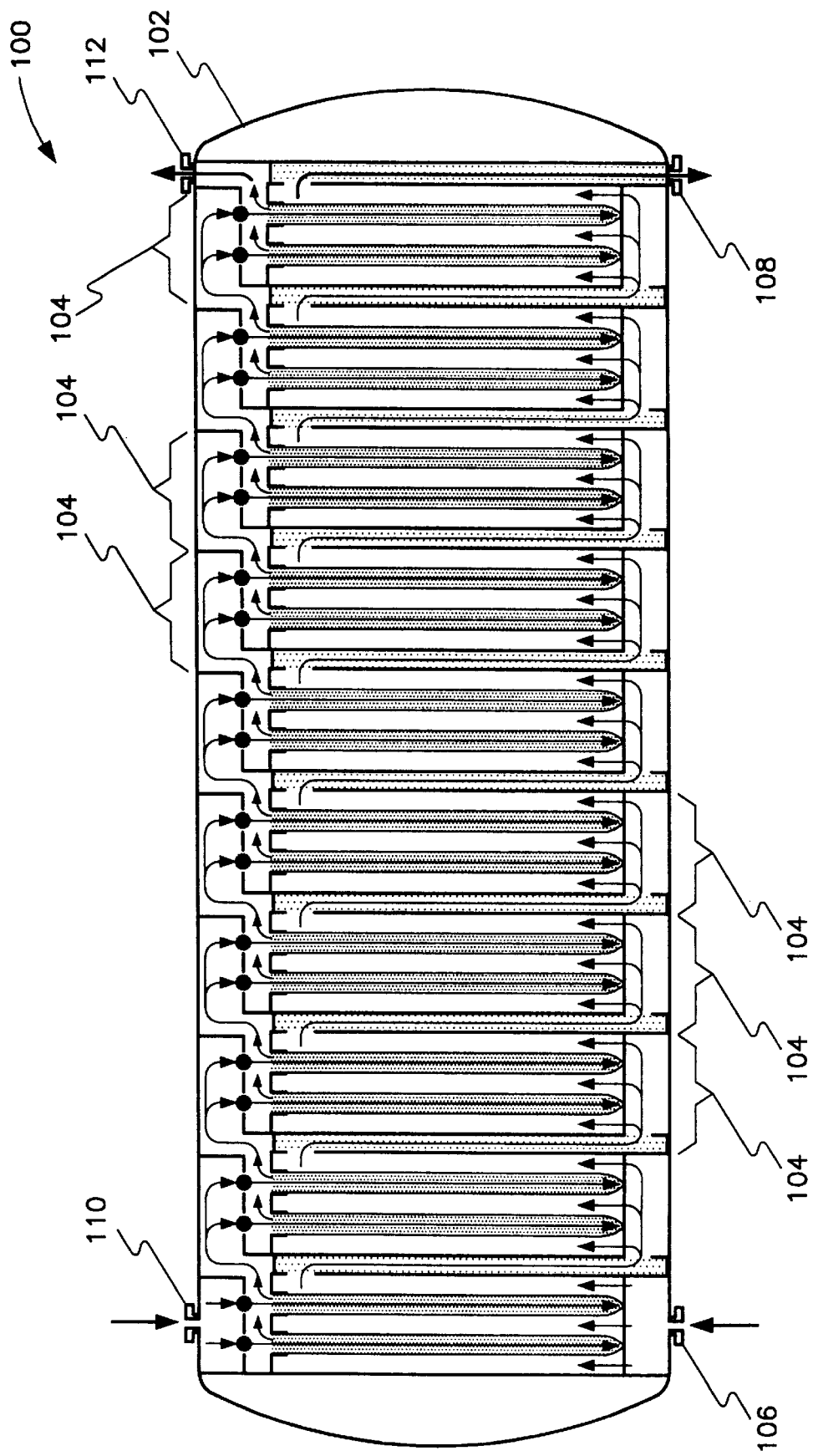
FIG. 7 shows the preferred embodiment of the multi-stage fuel cell system contained within a pressure vessel and as applied to solid oxide fuel cell (SOFC) technology.

FIGS. 6 and 7 show the preferred embodiment of the present method and apparatus, as applied to conventional SOFCs comprised of vertical fuel cell tubes or fuel cell tube bundles. FIG. 6 shows a two stage fuel cell apparatus 60, including fuel splitting and sharing technology. The pressure vessel 62 contains two temperature stages, a first intermediate temperature stage 64 and a second high temperature stage 66. The first stage 64 is upstream to the second downstream stage 66, relative to the flow of the process streams (gaseous oxidant and gaseous fuel) through the system. The first stage 64 is comprised of SOFC tubes 68 fabricated to operate in the temperature range of about 500° C. and about 800° C., and the stage 66 is comprised of SOFC tubes 70 fabricated to operate in the temperature range of about 800° C. and about 1100° C. The first stage has a fuel stream inlet 72 and an oxidant stream inlet 74, and the oxidant stream (air) and the fuel stream are pre-heated to a temperature of about 800° C. and co-currently or counter-currently supplied to the first stage 64. The process streams (air and fuel) are separated by the tubular construction of the cell, seals, and air plenums, as is known in the art. The process streams are discharged from the first stage 64 through a fuel stream outlet 76 and an oxidant stream outlet 78. Similarly, the second stage 66 has a fuel stream inlet 80 and an oxidant stream inlet 82 for receiving the process streams from the first stage 64, and a fuel stream outlet 84 and an oxidant stream outlet 86 for discharging the process streams to the central process stream outlets 88, 90 of the pressure vessel 62.

In operation, the fuel stream enters intermediate temperature first stage 64, where approximately 80 to 85% of the fuel is utilized before the temperature limit of the intermediate temperature fuel cell 64 is reached. The fuel cell stage operating temperature rises, and, in particular, the temperatures of the fuel and oxidant streams rise, because of the heat generated by the reactions occurring at the electrodes. Thus, the fuel and oxidant gases enter the first stage 64 at a temperature of about 500° C., react at the electrodes, absorb heat, and exit the first stage 64 through their respective process outlets 76, 78 at a temperature of about 800° C. The fuel gas and oxidant gas enter the second stage 66 via the process stream inlets 80, 82 at a temperature of about 800° C., react on the surface of the electrodes producing heat, and exit the second stage 66 via the process stream outlets 84, 86 at a temperature of about 1100° C. The fuel cells in the downstream stage 66 are constructed with materials selected to adequately perform under operating temperatures in the range of between about 800° C. and 1100° C. The high temperature exhaust may be used in a bottoming cycle.

In this embodiment, reforming catalysts 96 are positioned within a fuel stream channel 98 connecting the first and second stages. Reforming catalysts can be placed in the gas passages between fuel cell stages and/or strategically on the fuel cell surfaces, and convert gas to hydrogen. In addition, reforming catalyst control the temperatures inside the pressure vessel, because the reforming reaction is endothermic. In this way, internal fuel reforming absorbs excess heat from the electrochemical reaction providing for internal heat exchange. This embodiment further includes fuel and oxidant gas networking, as the heated fuel gas exiting the first stage 64, which contains approximately 15 to 20% unreacted fuel, is mixed with a fresh stream of fuel gas conducted through process stream inlet 92, and the oxidant gas exiting the first stage is mixed with a fresh oxidant stream conducted through process stream inlet 94. Importantly, as the oxidant and fuel stream inlet temperatures are lower than in prior art designs, the energy cost to heat the oxidant and fuel streams to process conditions is substantially reduced. There is also less oxidant to heat than in the prior art systems which rely on oxidant gases to provide cooling to the system.

FIG. 7 shows the preferred embodiment of the multi-stage fuel cell system 100 enclosed within a single pressure vessel 102 having a central fuel stream inlet 106, a central fuel stream outlet 108, a central oxidant stream inlet 110, and a central oxidant stream outlet 112. Each stage 104 is comprised of either a single tube, tube bundles, tube rows, or other configurations known in the art, and the number of tubes in any single stage may vary from other stages. Importantly, the stages are separated within the pressure vessel for the purpose of temperature control and heat management. The components of each stage are constructed from materials selected to accommodate the progressively higher downstream temperature requirements. In addition, by dividing heat load between stages, the change in temperature in any one stage is substantially reduced, decreasing the need to design the stage to withstand a large range of thermal expansion forces, once operating temperature is achieved. For example, smaller temperature changes within a stage minimizes cell and tube elongation, at normal operating conditions.

To design Applicants' multi-stage fuel cell system, the fixed fuel input is used to calculate the amount of heat liberated from the exothermic fuel cell reaction, and the number of stages is determined by the number of cells per stage and the reaction rate per unit surface area of fuel cell material. The temperature (heat released in each stage) is controlled by determining the reaction area (number of cells) in each fuel cell stage. Each stage may contain the same amount of cells (cell reaction area), but no greater than the number that would cause the allowable heat tolerances to be exceeded for the specific stage. Each stage is designed to operate at a desired temperature range, and the materials and fabrication techniques are selected according to the operating temperature range of the cells. The consumption of fuel in each stage is controlled by: (1) limiting reaction surface per stage; (2) controlling the rate of flow of the fuel stream through the stages; and (3) incorporating internal reforming to provide cooling. In this way, fuel is rich and underutilized in the first stages of the multi-stage fuel cell system, and substantially spent in the final stages of the system.

By predetermining the operating temperature ranges for each fuel cell within the fuel cell system, specific materials may be selected for construction of fuel cell components. For example, in a molten carbonate fuel cell (MCFC) system having a first stage designed to operate between a temperature range of about 560° C. to about 670° C. and connected in series to a second stage designed to operate between a temperature range of about 480° C. to about 720° C., a ternary eutectic electrolyte may be used in the first stage (such as 44 Li/26 K/30 Na), while a binary eutectic electrolyte may be used in the second stage (such as 60 Li/40 Na). This tandem fuel cell system increases the fuel cell operating temperature window over a prior art baseline design. In addition, a stainless steal material may be used for the main fuel cell construction, providing sufficient chemical stability up to about 720° C., while a fuel cell stage designed to operate at temperatures greater than 720° C. may be constructed from a nickel based high temperature alloy.

Figure 8:
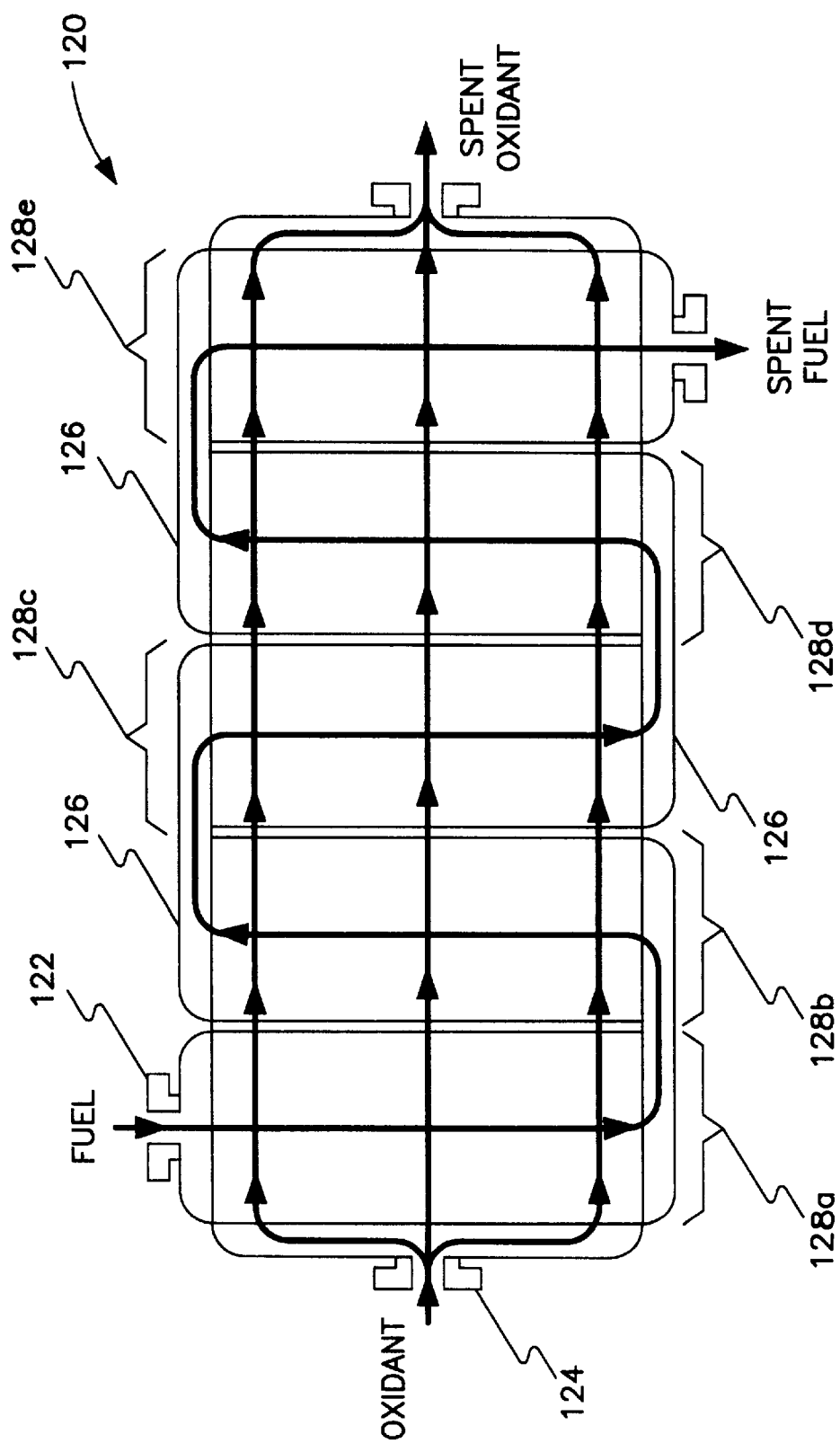
FIG. 8 shows a the present multi-stage fuel cell system embodying molten carbonate (MCFC), solid oxide (SOFC), or other planar fuel cell technologies.

FIG. 8 illustrates a five-stage fuel cell system 120 of the present method and apparatus embodying either MCFC, SOFC, or other planer fuel cell technologies. The process streams enter the system through central fuel inlet 122 and central fuel outlet 124. Conventional manifolding 126 is used to connect the stages 128a–128e in a serial flow-through arrangement. The downstream stages 128d, 128e are designed to operate at temperatures greater than the operating temperatures of the upstream stages 128a, 128b, and fuel is underutilized in each stage 128a–128e.

Figure 9:
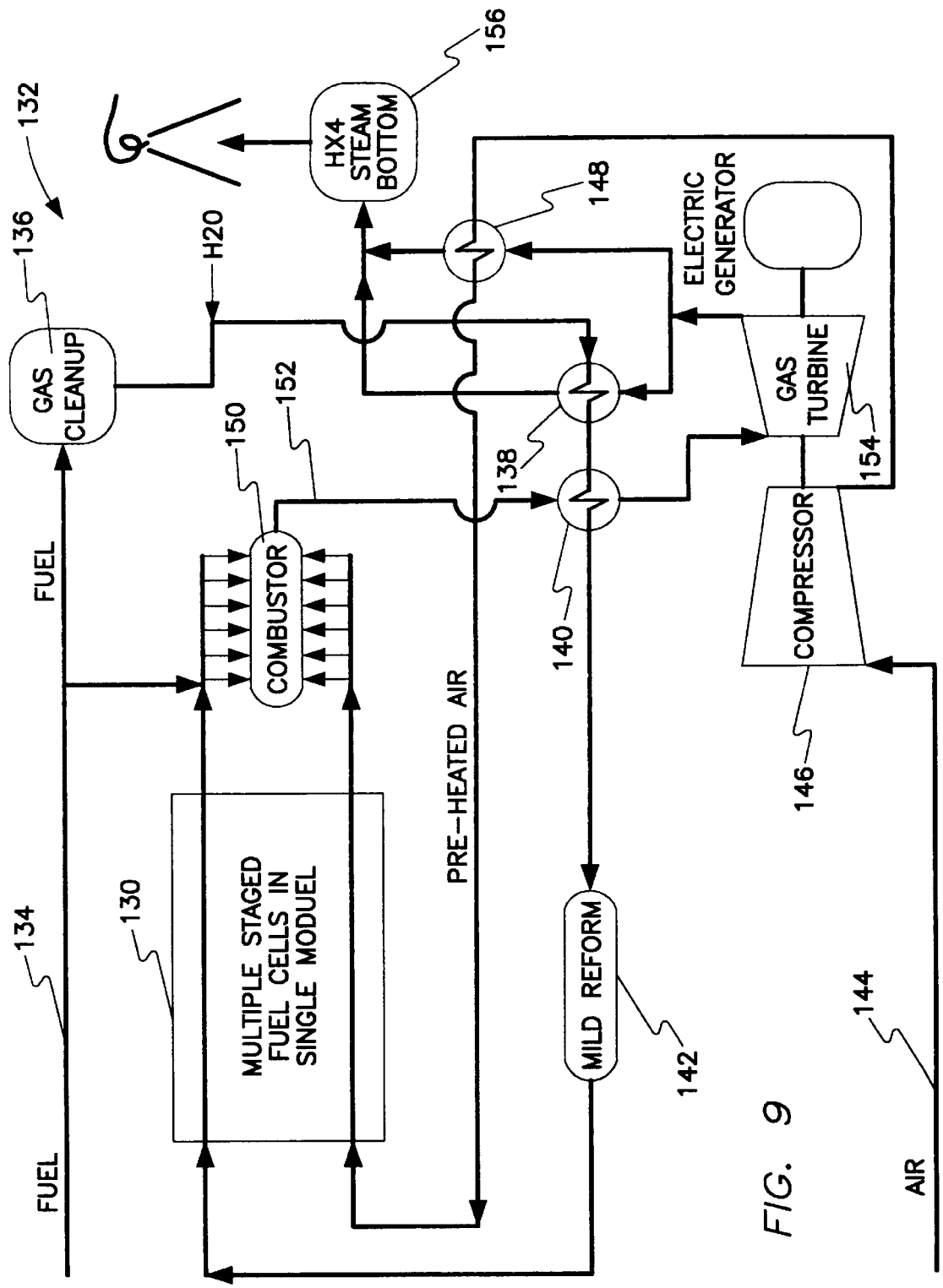
FIG. 9 is a schematic illustration of the present multi-stage fuel cell system incorporated into a fuel cell system bottoming turbine cogeneration plant.

FIG. 9 is a schematic of the Applicants' multi-stage fuel cell system 130 incorporated into a power generation plant 132. The fuel stream 134, initially comprised of natural gas, is subjected to a gas clean-up process 136 to remove sulfur and odorants. (Water may also be added to the fuel stream). Next, the cleaned fuel stream is heated 138, 140 to a predetermined inlet temperature and conducted to a mild reformer unit 142 to remove higher hydrocarbons, such as $C_2H_6$, $C_3H_8$, I—$C_4H_{10}$, and n-$C_4H_{10}$, which cause sooting problems down stream of the fuel cell stacks. The reforming reactions require the presence of water. The air stream 144 passes through a compressor 146 and is similarly heated 148 to a predetermined inlet temperature. The fuel and air streams enter the multi-stage fuel cell system 130, wherein fuel is consumed and temperature is controlled within each fuel cell stage according to the predetermined staging strategy. A multi-stage fuel cell system efficiency of over 80%, representing the efficiency of converting fuel to electricity, was calculated for the system illustrated in FIG. 9 by setting the system parameters listed in Table 2 below.

TABLE 2

| Temperature of Fuel Gas Inlet Stream | 450° C. |
|---|---|
| Temperature of Oxidant Gas Inlet Stream | 345° C. |
| Temperature of Spent Fuel Gas Outlet Stream | 750° C. |
| Temperature of Spent Oxidant Outlet Stream | 750° C. |

The optimum system efficiency is sensitive to fuel cell system inlet and outlet temperatures and, where the system includes a bottoming cycle (FIG. 9), the inlet temperature for the turbine. Controlling these temperatures allows optimal heat management of the fuel cell system. Also, by controlling the rise in temperature of the oxidant and fuel stream temperatures, the need for excess oxidant for cooling the fuel cell is significantly reduced. Reducing the size of the oxidant stream significantly improves system efficiency while reducing costs.

As further shown in FIG. 9, the spent process streams exit the multi-stage fuel cell system 130 and are combined in a combustor 150 to deplete any remaining fuel and to create a product stream 152 having a maximum temperature to provide energy to preheat incoming fuel stream 140 and for turbine 154 and steam 156 bottoming cycles, which produce additional electrical energy.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. While the invention has been described with reference to details of the illustrated embodiment, these details are not intended to limit the scope of the invention, rather the scope of the invention is to be defined by the claims appended hereto.

The embodiments of the invention in which an exclusive property or privilege is claimed are defined as follows:

1. A method for operating a multi-stage fuel cell system, comprising the steps of:

providing a plurality of fuel cell stages, each fuel cell stage having fuel and oxidant process stream inlets and outlets for conducting process streams through the fuel cell stage, and each fuel cell stage containing at least one fuel cell;

designing each fuel cell stage to operate within a desired temperature range, such that the multi-stage fuel cell system is comprised of fuel cell stages that operate at non-uniform temperatures;

assembling the plurality of fuel stages into the multi-stage fuel cell system by arranging the fuel cell stages in a series according to their operating temperature ranges, wherein downstream fuel cell stages accommodate progressively higher temperature fuel and oxidant streams than upstream stages, and connecting the process stream outlets of an upstream stage with the process stream inlets of an adjacent downstream stage;

supplying a fuel process stream and an oxidant process stream to the multi-stage fuel cell system; and underutilizing the fuel process stream in each fuel cell stage, such that the fuel process stream flowing through a fuel cell stage has an excess amount of fuel than the amount of fuel consumed by that fuel cell stage.

2. A method as recited in claim 1, wherein the step of designing each fuel cell stage to operate within a desired temperature range comprises the steps of:

determining the temperatures of the process streams entering the process stream inlets of the stage; and containing within the stage a desired number of fuel cells having a total reaction surface area, such that a certain amount of heat is released by the electrochemical reactions at the fuel cells and the temperature rise in the fuel cell stage under the operating conditions is delimited.

3. A method as recited in claim 1, wherein the step of designing each fuel cell stage to operate within a desired temperature range further comprises depositing a reforming catalyst within the fuel cell stage for absorbing heat.

4. A method as recited in claim 1, wherein the step of underutilizing, the fuel process stream in each fuel cell stage comprises utilizing less than about 85 percent of the fuel comprised in the fuel process stream flowing through the fuel cell stage.

5. A method as recited in claim 1, wherein the fuel cells contained within the fuel cell stages are solid oxide fuel cells.

6. A method as recited in claim 5, wherein the operating temperature range of an upstream fuel cell stage is in the range of between about 345° C. and about 800° C. and the operating temperature range of any downstream fuel cell stage is in the range of between about 800° C. and about 1100° C.

7. A method as recited in claim 1, wherein the fuel cells contained within the fuel cell stages are molten carbonate fuel cells.

8. A method as recited in claim 7, wherein the operating temperature range of an upstream fuel cell stage is in the range of between about 470° C. and about 600° C. and the operating temperature range of any downstream fuel cell stage is in the range of between about 600° C. and about 720° C.

9. A method as recited in claim 1, wherein the step of underutilizing the fuel comprising the fuel stream in each fuel cell stage comprises determining a fuel stream composition and a rate of flow through the multi-stage fuel cell system sufficient for underutilization of the fuel content of the fuel stream in each fuel cell stage, whereby a greater amount of fuel is supplied to each fuel cell stage than required by the fuel cells contained within the fuel cell stage for the chemical reaction of the fuel gas on the reaction surface areas of the fuel cells, such that the total fuel utilization for the multi-stage fuel cell system is greater than 90%.

10. A method as recited in claim 1, further comprising the step of containing the multi-stage fuel cell system in a pressure vessel having fuel and oxidant stream inlets in fluid communication with the fuel and oxidant stream inlets of the first fuel cell stage, and fuel and oxidant stream outlets in fluid communication with the fuel and oxidant stream outlets of the last fuel cell stage.

11. A method as recited in claim 1, wherein a first fuel cell stage has an operating temperature in the range of between about 400° C. and about 600° C., a second fuel cell stage adjacent to and downstream from the first fuel cell stage has an operating temperature in the range of between about 600° C. and about 800° C., and a third fuel cell stage adjacent to and downstream from the second fuel cell stage has an operating temperature in the range of between about 800° C. and about 1000° C.

12. A multi-stage fuel cell system, comprising:
at least one upstream fuel cell stage having an operating temperature range defined by a minimum operating temperature and a maximum operating temperature;
at least one downstream fuel cell stage having an operating temperature range defined by a minimum operating temperature and a maximum operating temperature, wherein the downstream fuel cell stage minimum operating temperature is greater than the upstream fuel cell stage maximum operating temperature; and
a fuel stream having a fuel content substantially greater than the fuel required for individual operation of said upstream and downstream fuel cell stages.

13. A multi-stage fuel cell system recited in claim 12, wherein less than about 85% of the fuel content in the fuel stream flowing through a fuel cell stage is consumed by that fuel cell stage.

14. A multi-stage fuel cell recited in claim 12, wherein the total fuel utilization for the multi-stage fuel cell system is greater than 90%.

15. A multi-stage fuel cell system as recited in claim 12, wherein the fuel cells contained within said upstream and downstream fuel cell stages are solid oxide fuel cells, and wherein the upstream fuel cell stage minimum operating temperature is about 345° C. and the upstream fuel cell stage maximum operating temperature is about 800° C., and the downstream fuel cell stage minimum operating temperature is about 800° C. and the downstream fuel cell stage maximum operating temperature is about 1100° C.

16. A multi-stage fuel cell system as recited in claim 12, wherein the fuel cells contained within said upstream and downstream fuel cell stages are molten carbonate fuel cells, and wherein the upstream fuel cell stage minimum operating temperature is about 470° C. and the upstream fuel cell stage maximum operating temperature is about 600° C., and the downstream fuel cell stage minimum operating temperature is about 600° C. and the downstream fuel cell stage maximum operating temperature is about 720° C.

17. A multi-stage fuel cell system as recited in claim 12, wherein a reforming catalyst is deposited within at least one fuel cell stage.

18. A multi-stage fuel cell system as recited in claim 12, further comprising a pressure vessel containing the multi-fuel cell system.

19. A method for optimizing the efficiency of a multi-stage fuel cell system, comprising the steps of:
providing at least one upstream fuel cell stage having an operating temperature range defined by a minimum operating temperature and a maximum operating temperature;
providing at least one downstream fuel cell stage having an operating temperature range defined by a minimum operating temperature and a maximum operating temperature, wherein the downstream fuel cell stage minimum operating temperature is greater than the upstream fuel cell stage maximum operating temperature; and
operating the downstream fuel cell stage at a higher temperature than the upstream fuel cell stage;
supplying a single fuel stream to the multi-stage fuel cell system, wherein the fuel stream enters the first upstream fuel cell stage and is conducted successively through adjacent downstream fuel cell stages; and
underutilizing the fuel contained in the fuel stream in each fuel cell stage, such that an excess amount of fuel remains in the fuel stream than the amount consumed by an individual fuel cell stage.

20. A method as recited in claim 19, wherein less than about 85% of the fuel content in the fuel stream flowing through any fuel cell stage is utilized in that fuel cell stage.

21. A method as recited in claim 19, wherein the total fuel utilization for the multi-stage fuel cell system is greater than 90%.

* * * * *